(12) United States Patent
Nakajima

(10) Patent No.: US 8,238,829 B2
(45) Date of Patent: Aug. 7, 2012

(54) COMMUNICATION APPARATUS, CONTROL METHOD OF COMMUNICATION APPARATUS, AND STORAGE MEDIUM

(75) Inventor: Yasuki Nakajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 12/776,255

(22) Filed: May 7, 2010

(65) Prior Publication Data

US 2011/0014869 A1 Jan. 20, 2011

(30) Foreign Application Priority Data

Jul. 17, 2009 (JP) .................................. 2009-168681

(51) Int. Cl.
*H04B 7/00* (2006.01)
*H04M 1/00* (2006.01)
*H04B 1/38* (2006.01)
(52) U.S. Cl. ........................ 455/41.2; 455/41.3; 455/566
(58) Field of Classification Search ............... 455/404.2, 455/41.2, 41.3, 411, 414.2, 456.1, 456.2, 455/456.3, 457, 566, 412.2
See application file for complete search history.

(56) References Cited

U.S. PATENT DOCUMENTS 7,933,234 B2 * 4/2011 Iso et al. ....................... 370/328

FOREIGN PATENT DOCUMENTS

JP 2008-099236 4/2008

* cited by examiner

*Primary Examiner* — Eugene Yun
(74) *Attorney, Agent, or Firm* — Fitzpatrick, Cella, Harper & Scinto

(57) ABSTRACT

To enable a user to easily approximate a portable information device to a position where the portable information device should be approximated so as to cause the portable information device and a communication apparatus to communicate with each other by wireless communication, there is provided a control method for controlling the communication apparatus, comprising: performing data transfer between the communication apparatus and the portable information device by the wireless communication through a communication unit; acquiring identification information for identifying the portable information device; and displaying position information which indicates the position where the portable information device should be approximated to the communication apparatus so that the portable information device identified by the acquired identification information and the communication unit perform the data transfer by the wireless communication.

8 Claims, 9 Drawing Sheets

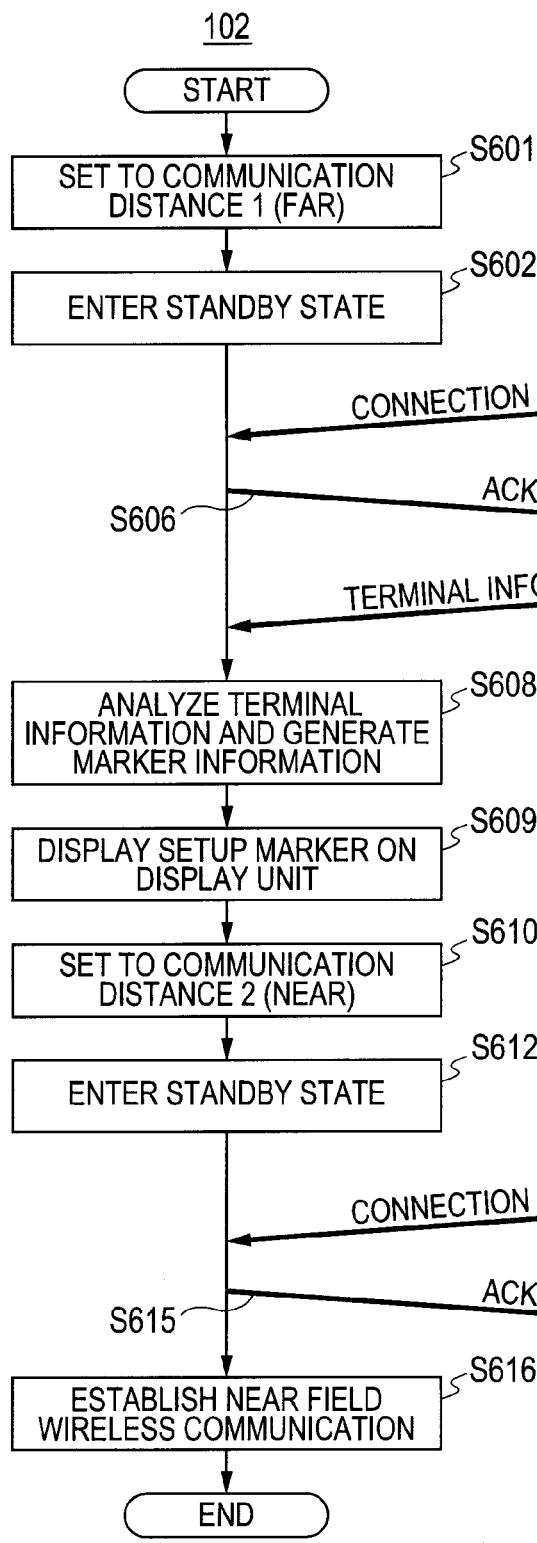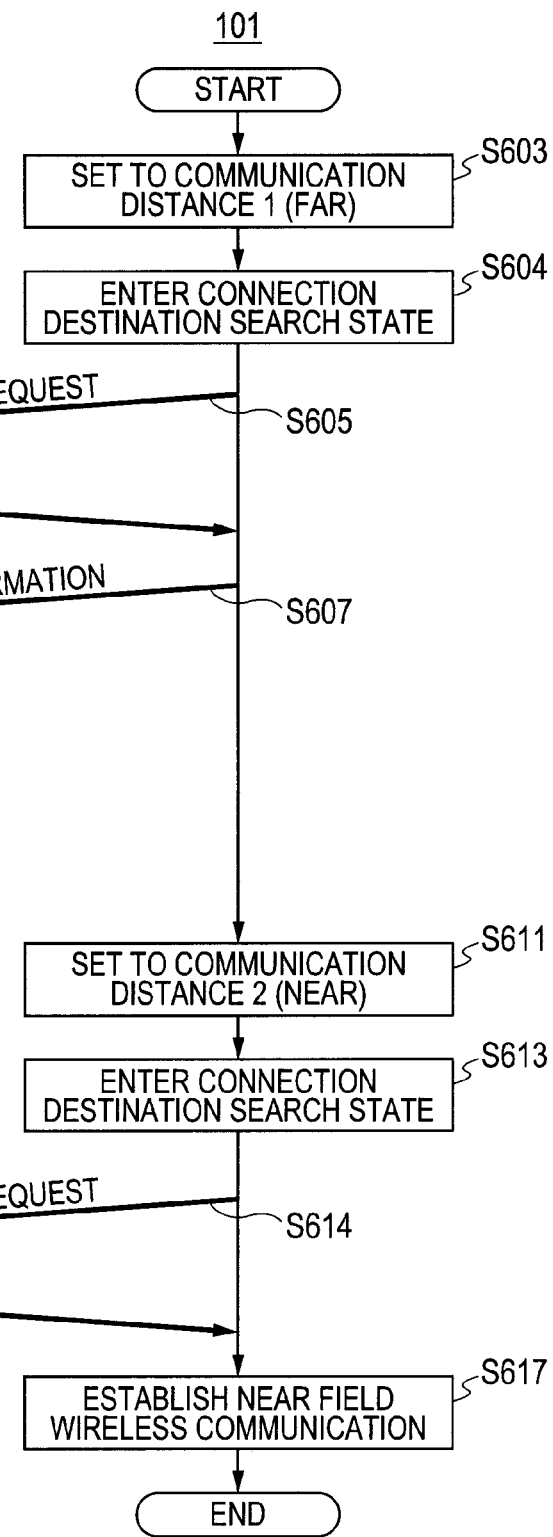

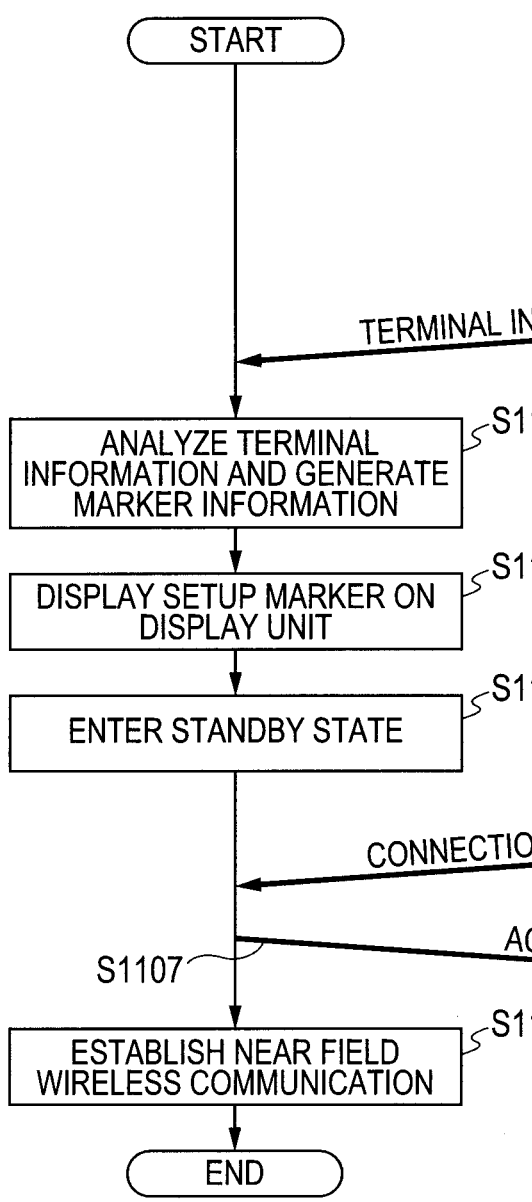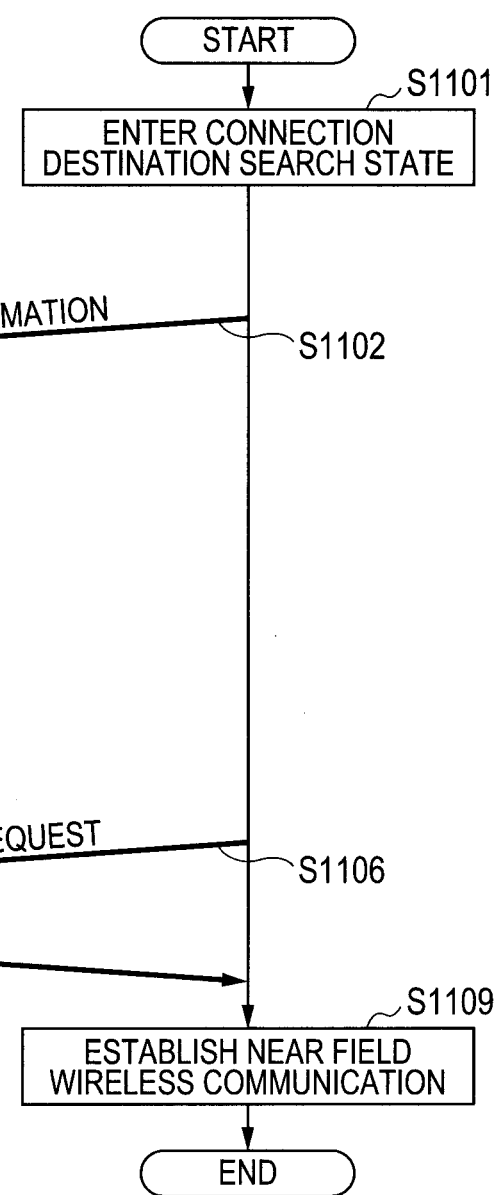

COMMUNICATION APPARATUS, CONTROL METHOD OF COMMUNICATION APPARATUS, AND STORAGE MEDIUM

BACKGROUND OF THE INVENTION

1. Field of the Invention

The present invention relates to a communication apparatus, a control method of the communication apparatus, and a storage medium for storing a program of performing the control method.

2. Description of the Related Art

Conventionally, a communication apparatus which performs such wireless communication as disclosed in Japanese Patent Application Laid-Open No. 2008-099236 has been proposed to perform high-speed communication with a portable information device of a communication partner.

In a technique disclosed in Japanese Patent Application Laid-Open No. 2008-099236, since a distance between apparatuses which perform communication with each other is set short (for example, the distance is set to about 3 cm), it is possible to avoid interference to another wireless communication system. Further, according to the technique disclosed in Japanese Patent Application Laid-Open No. 2008-099236, since it is possible to leave directivity of data communication out of consideration, a user may not worry about mutual physical orientations of the apparatuses which perform the communication with each other.

However, in such a method as described above, since the communicable distance between the communication apparatus and the portable information device is short, the user has to correctly gain an understanding of the position where the user should approximate the portable information device to the communication apparatus (that is, the position where the user should bring the portable information device close to the communication apparatus) so as to normally perform the communication between the portable information device and the communication apparatus.

For example, it is assumed that the communication apparatus should perform the communication with a digital camera. Here, a communication unit of the digital camera is often provided in the vicinity of the outer case of the camera (for example, on the bottom of the camera). For this reason, in a case where a user sets the digital camera to a setup table of a wireless interface, the user has to set an antenna, which has been disposed at a position that the user cannot see, to a correct position. Such a setting operation is difficult for the user. Further, if both the antenna of the portable information device and the antenna of the communication apparatus are not within a communicable range, it is impossible to normally perform high-speed communication between the portable information device and the communication apparatus.

SUMMARY OF THE INVENTION

The present invention, which has been completed to solve such conventional problems as described above, is to provide a communication apparatus comprising: a communication unit configured to perform data transfer between the communication apparatus and a portable information device by wireless communication; an acquiring unit configured to acquire identification information for identifying the portable information device; and a display unit configured to display position information which indicates a position where the portable information device should be approximated to the communication apparatus so that the portable information device which is identified by the identification information acquired by the acquiring unit and the communication unit perform the data transfer by the wireless communication.

Further features of the present invention will become apparent from the following description of exemplary embodiments with reference to the attached drawings.

BRIEF DESCRIPTION OF THE DRAWINGS

FIGS. 6A and 6B are flow charts indicating a communication processing procedure in a wireless data communication system.

FIGS. 11A and 11B are flow charts indicating a communication processing procedure of a wireless data communication system.

DESCRIPTION OF THE EMBODIMENTS

Preferred embodiments of the present invention will now be described in detail with reference to the attached drawings. Incidentally, techniques will be definitely described hereinafter as exemplary embodiments of the present invention. However, the scope of the present invention is not limited to these embodiments as far as there is no specific description of limiting the present invention.

First Embodiment

Hereinafter, the first embodiment of the present invention will be described with reference to the attached drawings.

Figure 1:
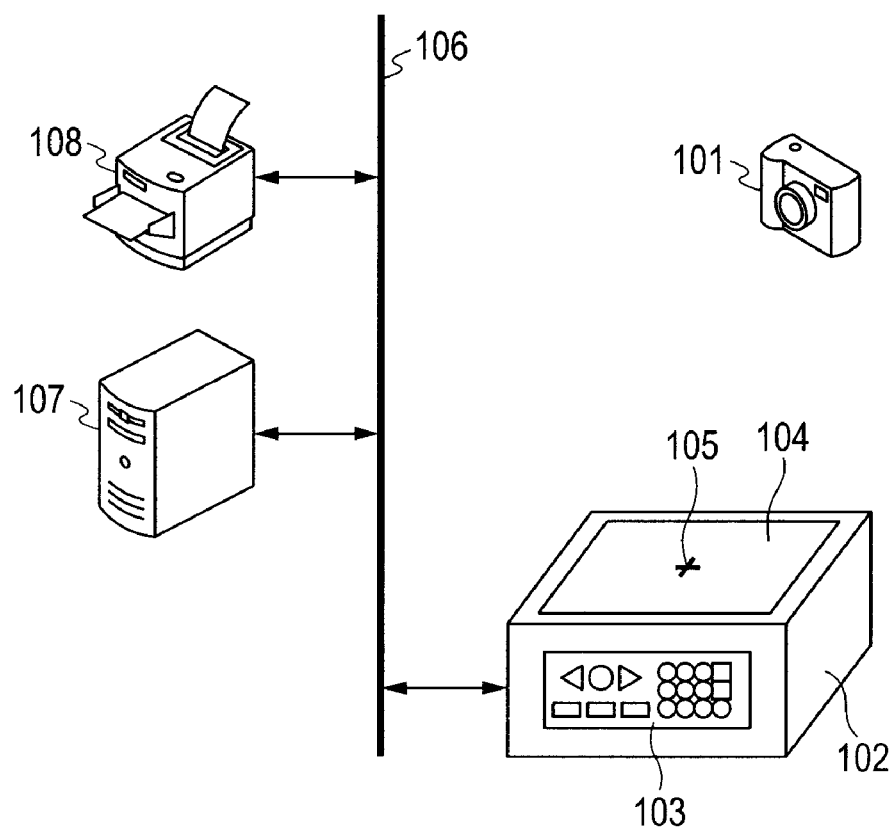
FIG. 1 is a diagram for describing a configuration of a data communication system according to an embodiment of the present invention.

FIG. 1 is a diagram for describing a configuration of a data communication system according to the present embodiment. Here, the present embodiment is directed to an example of the data communication system in which an information processing apparatus, an image forming apparatus and a wireless interface apparatus (i.e., a communication apparatus) are mutually wire-connected through a network and the wireless interface apparatus and a portable information device 101 are wirelessly connected to each other. Incidentally, as described later, the wireless interface apparatus has a function to discriminate the portable information device 101 which is approximated to the wireless interface apparatus.

The portable information device (portable information terminal) 101 is equipped with a wireless communication unit, and the internal constitution of the portable information device 101 will be later described in detail. Here, although the portable information device is described as a digital camera having a wireless communication function in the present embodiment, the present invention is not limited to this. That is, another portable information terminal having a digital camera function may be used. For example, the portable information device may be constituted by an information processing terminal which includes a PDA (personal digital assistance) having a near field wireless communication function as a first communication function and a Bluetooth™ communication function as a second wireless communication function.

A wireless interface apparatus 102 has an operation unit 103 and a display unit 104. Further, a wireless communication unit not illustrated in FIG. 1 is provided below the display unit 104. A mark 105, which is provided on the display unit 104, indicates a position of an antenna. Namely, the antenna of the wireless communication unit is disposed immediately below the mark 105. Further, the display unit 104 of the wireless interface apparatus 102 is used as a place on which the portable information device is put. Furthermore, the wireless interface apparatus 102 is connected to a network 106, whereby the wireless interface apparatus 102 transmits/receives various data to/from apparatuses and devices which are connected to the network 106. In any case, the constitution of the wireless interface apparatus 102 will be later described in detail.

A data server 107, which contains a not-illustrated hard disk drive, is connected to the network 106. The data server 107 stores various data such as image data and the like through the network 106. Further, antenna position information and outer shape information of all of portable information devices capable of performing communication with the above-described wireless interface apparatus.

A printer 108, which acts as an image forming apparatus, is connected to the network 106, whereby the printer 108 performs printing according to a print request sent from another apparatus or device also connected to the network 106. Incidentally, the image forming apparatus may be constituted by an MFP (multi function peripheral) instead of the printer 108.

Incidentally, in FIG. 1, the wireless interface apparatus 102, the data server 107 and the printer 108 are mutually connected to others through the network 106. However, two or three of the wireless interface apparatus 102, the data server 107 and the printer 108 may be constituted as a single apparatus. For example, the MF, which includes the wireless interface apparatus 102, the data server 107 (a server unit or a storage unit) and the printer 108 (a print unit), may perform communication with the portable information device 101.

Figure 2:
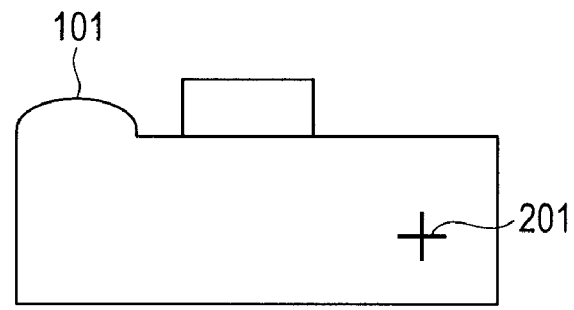
FIG. 2 is a two-dimensional diagram which is acquired by viewing a portable information device from its bottom side.

FIG. 2 is a two-dimensional diagram which is acquired by viewing the portable information device 101 from its bottom side. In FIG. 2, a mark 201 indicates a position of a wireless communication antenna which is provided in the portable information device 101, and the mark 201 is described on the outer case of the portable information device 101. Incidentally, in the portable information device 101, the wireless communication antenna is installed in the vicinity of the mark 201.

Figure 3:
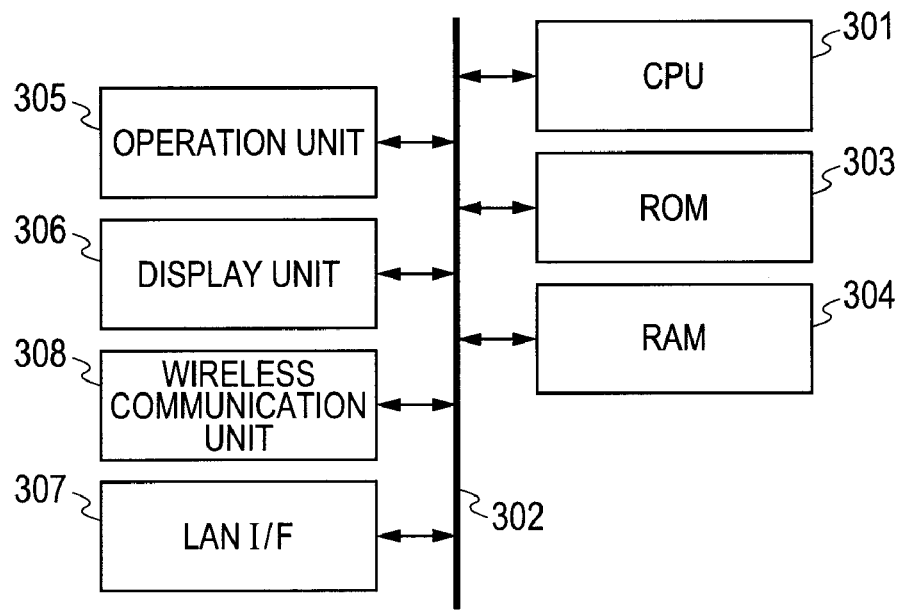
FIG. 3 is a block diagram for describing a constitution of a wireless interface apparatus.

FIG. 3 is a block diagram for describing the constitution of the wireless interface apparatus 102 illustrated in FIG. 1. In FIG. 3, a CPU (central processing unit) 301, which is connected to a system bus 302, totally controls the whole of the wireless interface apparatus 102. The CPU 301 performs various operations based on programs read from a ROM (read only memory) 303 through the system bus 302. A RAM (random access memory) 302 is used as a working area for the operation of the CPU 301 and an area for storing therein image data.

An operation unit 305 has plural button keys by which a user inputs operation commands to perform various operations. A display unit 306, which is constituted by an LCD (liquid crystal display), displays current states of the apparatus, operation instructions for the user, and the like. Also, the display unit 306 is used as the place on which the portable information device is put. A LAN I/F (local area network interface) 307, which is connected to the network 106, inputs/outputs information from/to the apparatuses also connected to the network 106. A wireless communication unit 308 performs wireless communication with the portable information device which has a wireless communication unit of the same kind.

Figure 4:
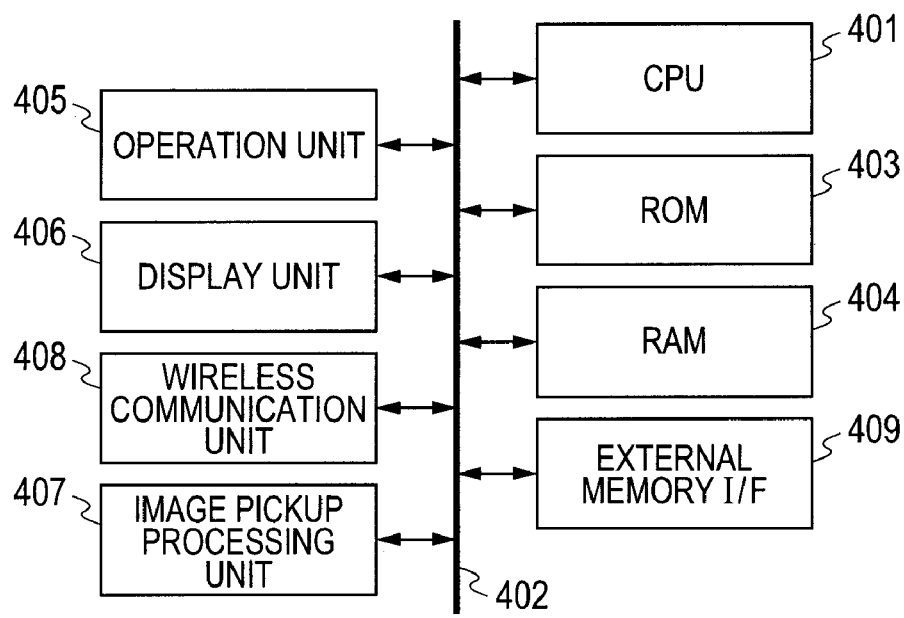
FIG. 4 is a block diagram for describing a constitution of the portable information device.

FIG. 4 is a block diagram for describing the constitution of the portable information device 101 illustrated in FIG. 1. In FIG. 4, a CPU 401, which is connected to a system bus 402, totally controls the whole of the portable information device 101. The CPU 401 performs various operations based on programs read from a ROM 403 through the system bus 402.

A RAM 404 is used as a working area for the operation of the CPU 401 and an area for storing therein image data. An operation unit 405 has plural button keys by which a user inputs operation commands to perform various operations. A display unit 406, which is constituted by an LCD, displays current states of the device, operation instructions for the user, captured image data, and the like.

An image pickup processing unit 407 is constituted by an optical lens unit, a CCD (charge coupled device) image sensor, an analog/digital conversion unit, and an image processing unit. The image pickup processing unit 407 generates digital image data from a photographed image, performs various image processes such as a filter process, a color conversion process, a gamma correction and the like to the generated digital image data, and then performs a compression process to the processed image data to generate the image data of JPEG (Joint Photographic Experts Group) format.

A wireless communication unit 408 performs wireless communication with the wireless interface apparatus which has the wireless communication unit of the same kind. An external memory interface unit 409, which is connected to a detachable memory card, writes/reads data into/from the memory card. Further, terminal information which is inherent in the portable information device has been stored in the ROM 403. Here, the terminal information includes at least identification information (i.e., an inherent ID) for identifying the portable information device. If circumstances require, antenna position information indicating the position of the antenna disposed in the portable information device and outer shape information indicating the outer shape of the portable information device are included in the identification information.

Figure 5:
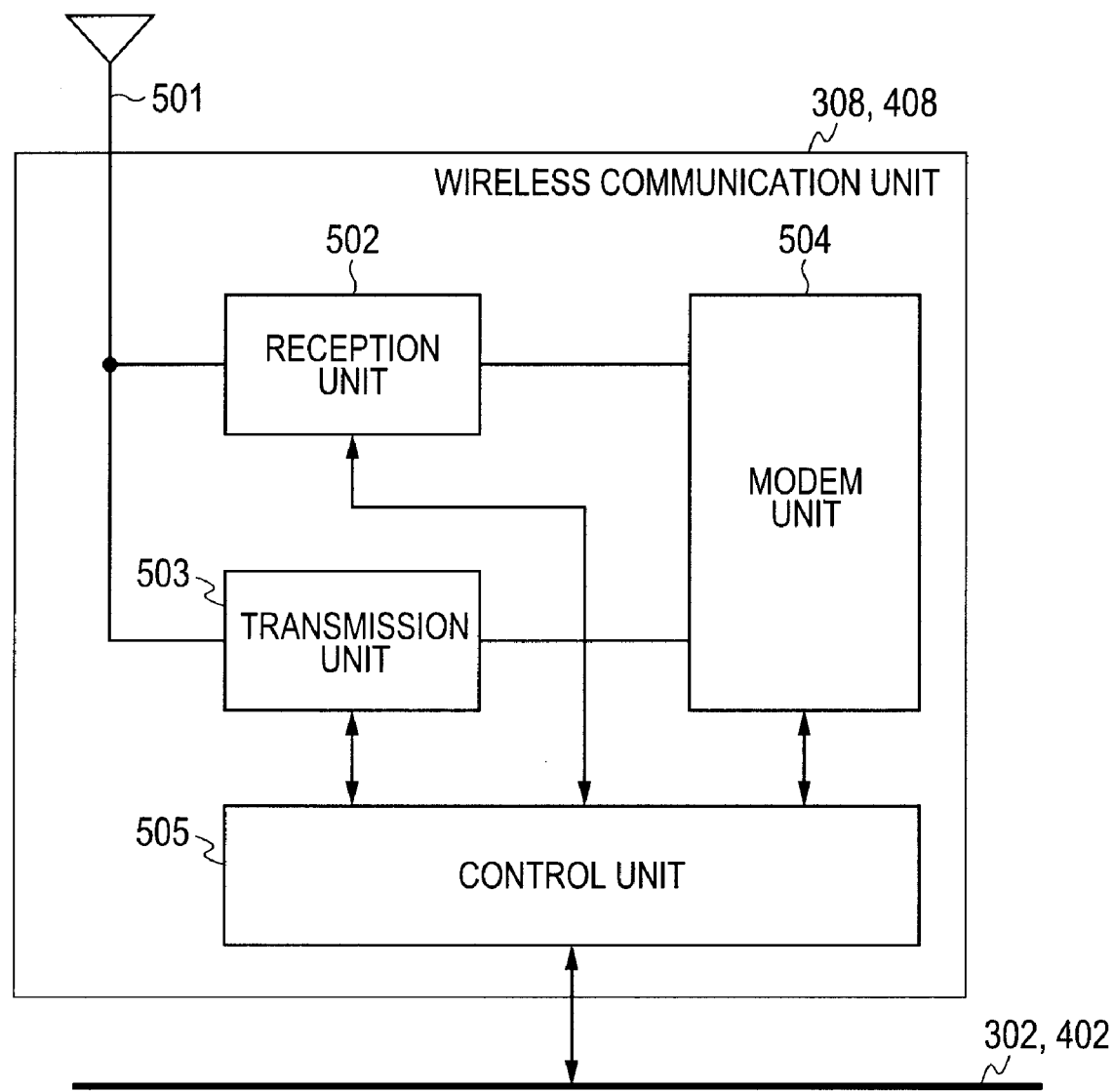
FIG. 5 is a block diagram for describing a constitution of a wireless communication unit.

FIG. 5 is a block diagram for describing the constitution of each of the wireless communication units 308 and 408 respectively provided in the portable information device 101 and the wireless interface apparatus 102 both illustrated in FIG. 1. In FIG. 5, each of the wireless communication units 308 and 408 has an antenna 501 which transmits/receives transmission/reception signals, a reception unit 502 which receives a wireless channel signal, and a transmission unit 503 which transmits the transmission signal. Further, each of the wireless communication units 308 and 408 has a not-illustrated PLL (phase-locked loop), a modem unit 504 which modulates/demodulates communication data and can change wireless transmission speed and output, and a control unit 505 which controls the whole of the wireless communication unit.

Each of the wireless communication units 308 and 408 can change a wireless communication applicable distance if the control unit 505 controls settings of the wireless transmission speed and the output of the modem unit 504.

Subsequently, the processes at the time when the wireless interface apparatus 102 and the portable information device 101 start communication in the wireless data communication system according to the present invention will be described in detail, with reference to FIGS. 6A and 6B.

FIGS. 6A and 6B are directed to a flow chart indicating an example of a communication processing procedure in the wireless data communication system according to the present embodiment. More specifically, this example is directed to the process to be performed before data transmission/reception between the portable information device 101 and the wireless interface apparatus 102 is started. Incidentally, it should be noted that FIG. 6A is directed to the communication process on the side of the wireless interface apparatus 102 and FIG. 6B is directed to the communication process on the side of the portable information device 101. Here, processes in S601, S602, S606, S608, S609, S610, S612, S615 and S616 are achieved if the CPU 301 of the wireless interface apparatus 102 loads a control program stored in the ROM 303 into the RAM 304 and thus performs the loaded control program. Further, processes in S603, S604, S605, S607, S611, S613, S614 and S617 are achieved if the CPU 401 of the portable information device 101 loads a control program stored in the ROM 403 into the RAM 404 and thus performs the loaded control program.

If the wireless interface apparatus 102 is activated, the CPU 301 sets a wireless communication application distance of the wireless communication unit 308 to a distance 1 in S601. Here, it should be noted that a relation between the distance 1 and a later-described distance 2 satisfies "distance 1>distance 2". Incidentally, in the present embodiment, the wireless interface apparatus 102 can identify or discriminate the portable information device 101 which is approximated in the state that the distance between the wireless interface apparatus 102 and the portable information device 101 is equivalent to the distance 1.

Further, the distance 2 is equivalent to the distance between the antennas of the wireless interface apparatus 102 and the portable information device 101 at the time when the portable information device 101 is put and set on the display unit 104 of the wireless interface apparatus 102, which acts as the place on which the portable information device 101 is put, so that the mark 105 indicating the position of the antenna of the wireless interface apparatus 102 and the mark 201 indicating the position of the antenna of the portable information device 101 substantially overlap each other. Furthermore, as described in the above background art, the distance 2 is equivalent to the distance which is effective in performing high-speed wireless communication. That is, the distance 2 implies the distance which establishes the near field wireless communication between the portable information device 101 and the wireless interface apparatus 102.

Next, in S602, the wireless interface apparatus 102 then enters a standby state. Here, it should be noted that the standby state is the state that the wireless interface apparatus 102 waits for a connection request from the portable information device 101.

On the other hand, if the portable information device 101 is activated, the CPU 401 sets a wireless communication application distance of the wireless communication unit 408 to the distance 1 in S603. Then, the portable information device 101 enters a connection destination search state in S604. Here, it should be noted that the connection destination search state is the state that the connection request is sent from the wireless communication unit 408 at any time. However, since the wireless communication application distance has been set to the distance 1, it is impossible for the portable information device 101 to perform communication with a wireless communication unit at the position farther than the distance 1.

Subsequently, the portable information device 101 is approximated to the wireless interface apparatus 102 by the user, whereby the distance between the portable information device 101 and the wireless interface apparatus 102 becomes shorter than the distance 1. In S605, the wireless interface apparatus 102 recognizes the connection request output by the portable information device 101. Then, in S606, the wireless interface apparatus 102 transmits an acknowledge signal (ACK) to the portable information device 101.

Subsequently, if the portable information device 101 receives the acknowledge signal (ACK) from the wireless interface apparatus 102, the CPU 401 of the portable information device 101 transmits in S607 identification information which is inherent in the portable information device 101 and has been stored in the ROM 403 (hereinafter, this information is called terminal information) to the wireless interface apparatus 102.

Then, if the wireless interface apparatus 102 receives the terminal information, the wireless interface apparatus 102 analyzes the received terminal information and generates setup marker information based on the analyzed terminal information in S608.

Here, as described above, although at least the ID information which is inherent in the portable information device 101 is included in the terminal information, position information of the antenna disposed in the portable information device 101 and outer shape information of the portable information device 101 are not necessarily included in the terminal information.

Figure 8A:
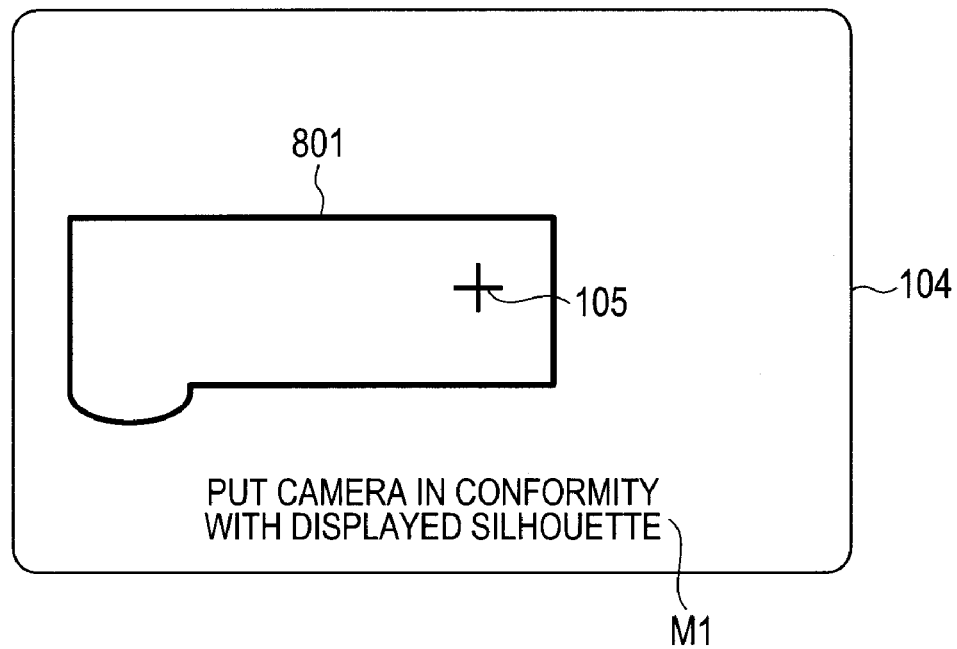
FIGS. 8A and 8B are diagrams illustrating examples of a setup marker to be displayed on a display unit.
Figure 8B:
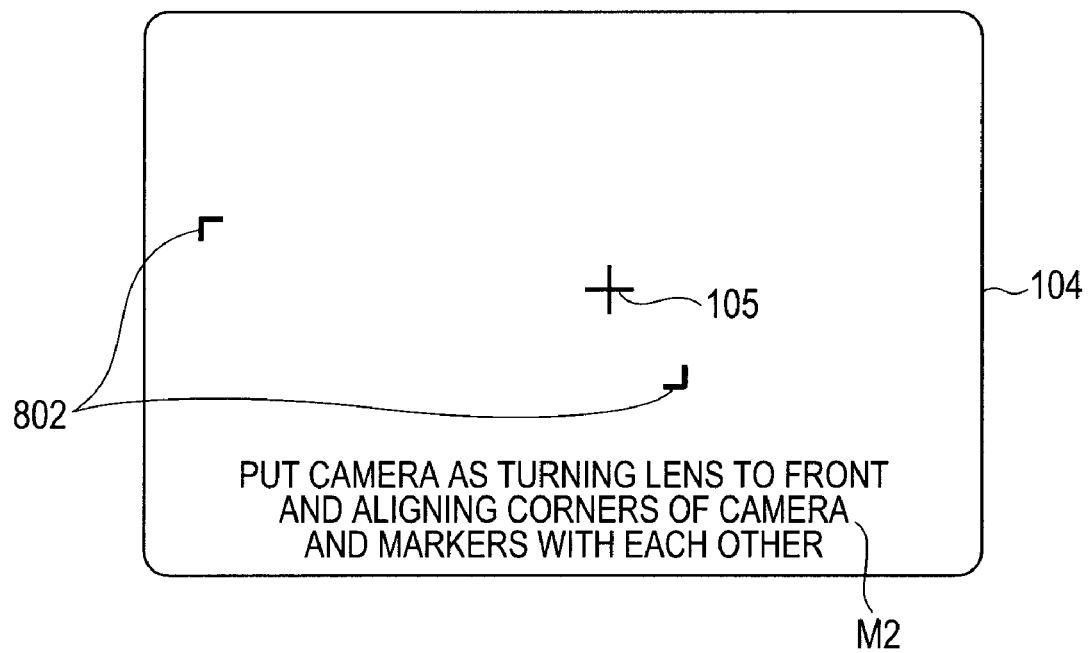

Subsequently, in S609, the wireless interface apparatus 102 displays on the display unit 104 guide information which includes position information (a setup marker) indicating a setup position and messages, according to the generated setup marker information, as illustrated in FIGS. 8A and 8B.

FIGS. 8A and 8B are the diagrams illustrating examples of the setup markers to be displayed on the display unit 104 illustrated in FIG. 1. In this example, the positions to which the portable information device 101 should be set and messages M1 and M2 which are used to urge the user to set the portable information device 101 are displayed on the display unit 104.

In FIG. 8A, a setup marker 801, which indicates the silhouette (i.e., the outer shape) of the bottom of the portable information device 101, and the message M1 are displayed on the display unit 104. Further, in FIG. 8B, a setup marker 802, which indicates the position made by the diagonal corners of the bottom of the portable information device 101, and the message M2 are displayed on the display unit 104. Incidentally, it should be noted that the setup markers 801 and 802 are examples of positioning information which is used for positioning the portable information device 101 so as to approximate the positions of the antennas of the portable information device 101 and the wireless interface apparatus 102 to each other.

In the present embodiment, the setup marker 801 or the setup marker 802 is included in the guide information for guiding the position to which the portable information device 101 should be set so as to approximate the antennas of the portable information device 101 and the wireless interface apparatus 102 to each other. Also, the message information is included in the guide information. Thus, the user can set the portable information device 101 so as to be able to establish the wireless communication between the portable information device 101 and the wireless interface apparatus 102 at the distance 2.

Subsequently, in S610, the CPU 301 of the wireless interface apparatus 102 controls the wireless communication unit 308 to set the wireless communication distance to the distance 2. Then, in S612, the wireless interface apparatus 102 enters the standby state.

On the other hand, after the portable information device 101 transmitted the terminal information, in S611, the CPU 401 of the portable information device 101 controls the wireless communication unit 408 to set the wireless communication distance to the distance 2. Then, in S613, the portable information device 101 enters the connection destination search state.

At that time, as described above, the setup marker for the portable information device 101 is displayed on the display unit 104 of the wireless interface apparatus 102 which acts as the place on which the portable information device 101 is put. For this reason, the user can easily put and set the portable information device 101 to the correct position on the display unit 104 which is the place to which the portable information device 101 is set, according to the displayed setup marker. Thus, the distance between the antennas of the wireless interface apparatus 102 and the portable information device 101 becomes equal to the distance 2.

At that time, the wireless interface apparatus 102 confirms the connection request transmitted from the portable information device 101 in S614, and transmits the acknowledge signal (ACK) to the portable information device 101 in S615. Next, in S616, the wireless interface apparatus 102 establishes the near field wireless communication between the wireless interface apparatus 102 and the portable information device 101. Further, in S617, the portable information device 101 establishes the near field wireless communication between the portable information device 101 and the wireless interface apparatus 102, and the process ends. After then, a mutual data communication process is performed between the portable information device 101 and the wireless interface apparatus 102 according to an instruction from the user who operates the portable information device 101. For example, it is possible to transmit the image data stored in the portable information device 101 to the image forming apparatus (i.e., the printer) 108 through the wireless interface apparatus 102, and thus cause the image forming apparatus 108 to print the transmitted image data. Further, if the image forming apparatus 108 is the MFP, it is possible to cause the image forming apparatus 108 to further transfer the image data. Incidentally, the image forming apparatus 108 may automatically print and/or transfer the image data in response to the reception of the image data from the portable information device 101. Alternatively, the image forming apparatus 108 may print and/or transfer the image data in response to an instruction input by the user through the operation unit.

Figure 7:
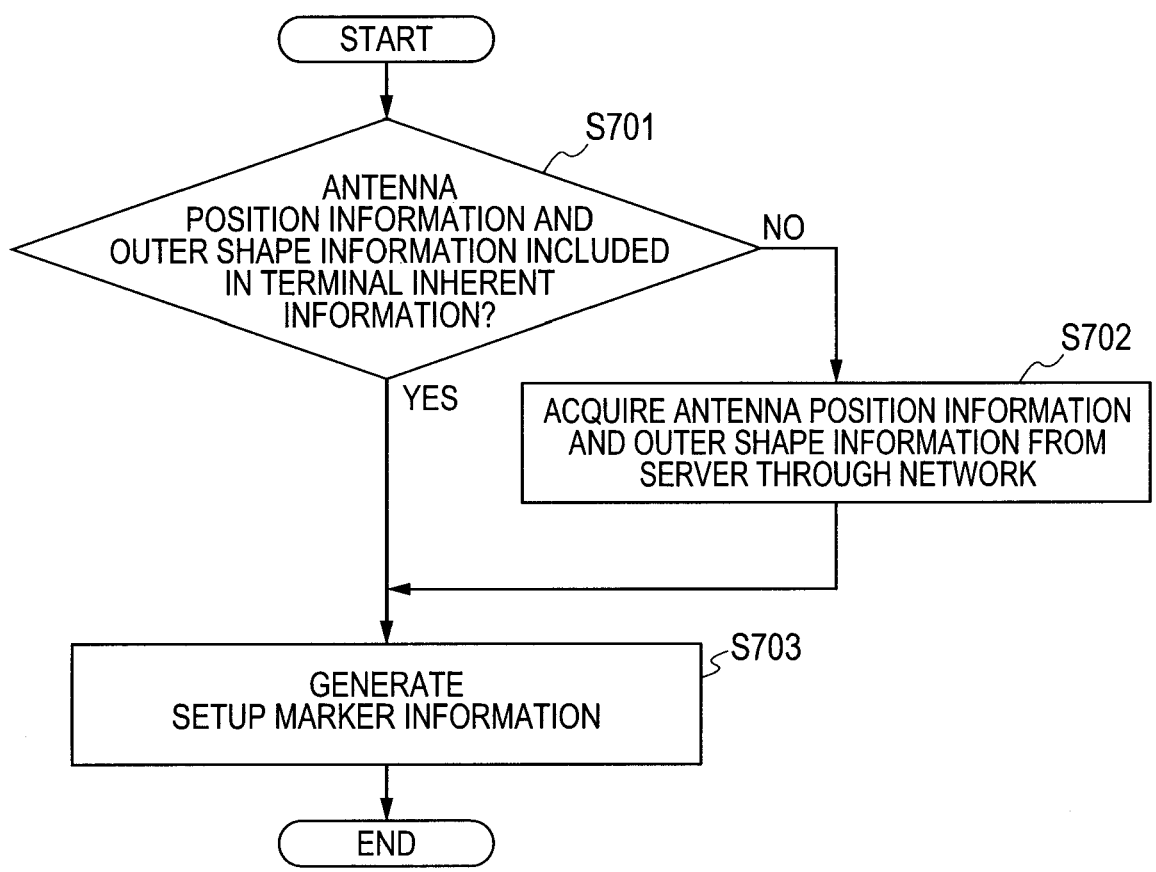
FIG. 7 is a flow chart indicating a data process to be performed by the wireless interface apparatus.

FIG. 7 is a flow chart indicating an example of a data process to be performed by the wireless interface apparatus according to the present embodiment. More specifically, this example is directed to the setup marker generation process to be performed by the wireless interface apparatus 102 in S608. Incidentally, processes in S701, S702 and S703 are achieved if the CPU 301 of the wireless interface apparatus 102 loads a control program stored in the ROM 303 into the RAM 304 and thus performs the loaded control program.

Initially, if the wireless interface apparatus 102 receives the terminal information from the portable information device 101, the wireless interface apparatus 102 analyzes the received terminal information. Then, in S701, the CPU 301 of the wireless interface apparatus 102 judges whether or not the antenna position information and the outer shape information are included in the received terminal information. Here, if the CPU 301 judges that the antenna position information and the outer shape information are not included in the received terminal information, the flow advances to S702. Then, in S702, the wireless interface apparatus 102 acquires the antenna position information of the antenna disposed in the target portable information device and the outer shape information of the target portable information device from the data server 107 through the network 106, and the flow advances to S703. That is, the antenna position information and the outer shape information for each of the devices discriminated by the terminal information have been previously registered.

On the other hand, if the CPU 301 judges in S701 that the antenna position information and the outer shape information are included in the received terminal information, the flow advances to S703. In S703, the setup marker information to be displayed on the display unit 104 is generated based on the antenna position information and the outer shape information both acquired from the server or the portable information device 101.

Incidentally, if the antenna position information and the outer shape information are included in the received terminal information, the setup marker information is generated by using the terminal information in S703.

As just described, since the user is guided by the setup marker and the message both displayed on the communication table provided in the wireless interface apparatus, he/she can perform the setup operation as looking the communication table and the portable information device. Thus, it is possible for the user to easily put and set the portable information device to the correct position on the communication table.

Consequently, it becomes possible to surely and easily start the near field wireless communication in the state that the distance between the portable information device 101 and the wireless interface apparatus 102 is equivalent to the distance 2.

Second Embodiment

In the above-described first embodiment, the wireless interface apparatus 102 and the portable information device 101 respectively have the wireless communication units 308 and 408 to which the communication distance can be variably set, and the terminal information has been stored in the ROM 403 of the portable information device 101. On the other hand, according to the second embodiment, in each of the respective wireless communication units 308 and 408 of the wireless interface apparatus 102 and the portable information device 101, a communication distance is fixed to the above-described distance 2. Further, a second communication unit, other than each of the wireless communication units 308 and 408, which can perform communication with each of the wireless communication units 308 and 408, and to which a communication distance is set to be wider than the distance 2, is newly provided.

Here, it is assumed that, in the second communication unit according to the second embodiment, an RFID (Radio Frequency IDentification) technique of performing non-contact information transmission by electromagnetic induction is used, and that, in the first communication unit, the wireless communication units 308 and 408 of performing the near field wireless communication are used. Further, it is assumed that an RFID memory, in which the terminal information has been stored, is provided in the portable information device 101, and that an RFID reader is provided in the wireless interface apparatus 102.

Figure 9:
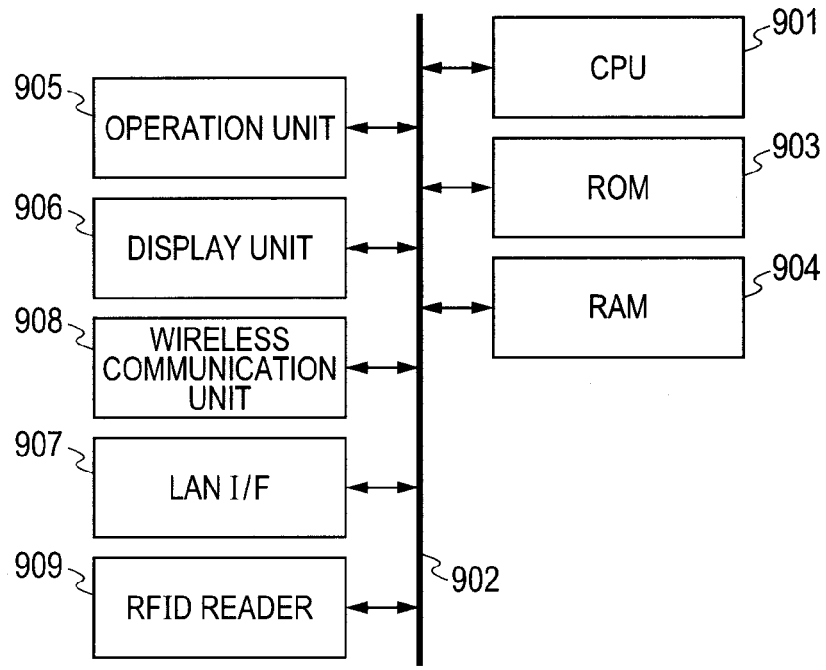
FIG. 9 is a block diagram for describing a constitution of a wireless interface apparatus.

FIG. 9 is a block diagram for describing a constitution of the wireless interface apparatus according to the present embodiment. In FIG. 9, it should be noted that the constitutions of a CPU 901, a system bus 902, a ROM 903, a RAM 904, an operation unit 905, a display unit 906, a LAN I/F 907 are the same as those in the respective corresponding constituent units of the wireless interface apparatus 102 in the first embodiment. Here, although the constitution of a wireless communication unit 908 is substantially the same as that of the wireless communication unit 308 in the first embodiment, the wireless communication unit 908 is different from the wireless communication unit 308 in the point that the setting of the communication distance is fixed to the distance 2 as described above.

An RFID reader unit 909 has an information reading function to read out the terminal information stored in the storage unit of the RFID element provided in the portable information device 101. That is, the RFID reader unit 909 can read out the terminal information from the RFID element provided in the portable information device 101 by performing wireless communication with the portable information device 101 in a non-contact state.

Figure 10:
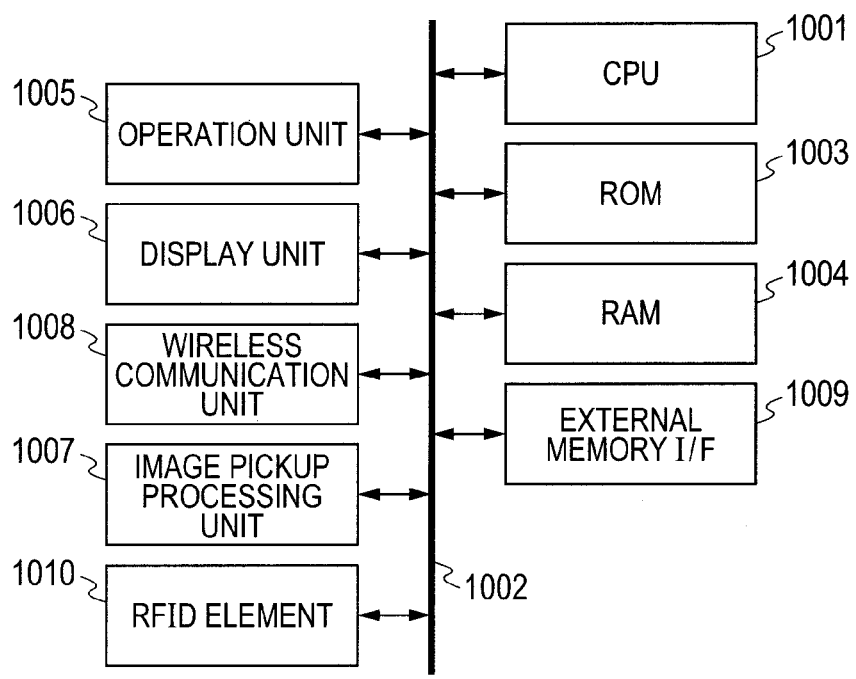
FIG. 10 is a block diagram for describing a constitution of a portable information device.

FIG. 10 is a block diagram for describing a constitution of the portable information device 101 according to the present embodiment. In FIG. 10, it should be noted that the constitutions of a CPU 1001, a system bus 1002, a ROM 1003, a RAM 1004, an operation unit 1005, a display unit 1006, an image pickup processing unit 1007, an external memory I/F 1009 are the same as those in the respective corresponding constituent units of the portable information device 101 in the first embodiment. Here, although the constitution of a wireless communication unit 1008 is substantially the same as that of the wireless communication unit 408 in the first embodiment, the wireless communication unit 1008 is different from the wireless communication unit 408 in the point that the setting of the communication distance is fixed to the distance 2. Further, an RFID element 1010 contains a storage unit for storing the terminal information.

FIGS. 11A and 11B are directed to a flow chart indicating an example of a communication processing procedure in the wireless data communication system according to the present embodiment. More specifically, this example is directed to the process to be performed before data transmission/reception between the portable information device 101 and the wireless interface apparatus 102 is started. Incidentally, it should be noted that FIG. 11A is directed to the communication process on the side of the wireless interface apparatus 102 and FIG. 11B is directed to the communication process on the side of the portable information device 101. Here, processes in S1103, S1104, S1105, S1107 and S1108 are achieved if the CPU 901 of the wireless interface apparatus 102 loads a control program stored in the ROM 303 into the RAM 304 and thus performs the loaded control program. Further, processes in S1101, S1102, S1106 and S1109 are achieved if the CPU 1001 of the portable information device 101 loads a control program stored in the ROM 403 into the RAM 404 and thus performs the loaded control program.

Hereinafter, the flow of the process to be performed at the time when the communication between the wireless interface apparatus 102 and the portable information device 101 is started will be described in detail.

If the portable information device 101 is activated, the CPU 1001 sets the wireless communication unit 1008 to enter the connection destination search state in S1101. Then, the portable information device 101 is approximated to the wireless interface apparatus 102 by a user, and the portable information device 101 is set at the position nearer than the communicable distance of the RFID reader.

Then, in S1102, the wireless interface apparatus 102 reads out the terminal information from the RFID element of the portable information device 101. Further, in S1103, the wireless interface apparatus 102 analyzes the received terminal information and generates setup marker information based on the analyzed terminal information. Next, in S1104, the wireless interface apparatus 102 displays on the display unit 104 the setup marker according to the generated setup marker information.

Subsequently, in S1105, the CPU 901 of the wireless interface apparatus 102 controls the wireless communication unit 908 to set the wireless communication distance, and the wireless interface apparatus 102 enters the standby state. Here, the operation to be performed in the following steps of S1106 to S1109 is the same as that described in the first embodiment.

According to the present embodiment, it becomes possible to surely and easily start the near field wireless communication in the state that the distance between the portable information device 101 and the wireless interface apparatus 102 is equivalent to the distance 2.

Third Embodiment

Subsequently, the third embodiment of the present invention will be described.

In the above-described second embodiment, the RFID element is provided in the portable information device 101, the terminal information is stored in the storage unit of the RFID element, and the terminal information is read and acquired by the RFID reader provided in the wireless interface apparatus 102.

On the other hand, according to the third embodiment, the terminal information is described (added) as a bar code on an outer case of the portable information device 101, a bar code reader is provided in the wireless interface apparatus 102, and the terminal information of the portable terminal device 101 is read and acquired by the bar code reader of the wireless interface apparatus 102. Incidentally, the terminal information may be provided by other image information such as a QR (Quick Response) code or the like instead of the bar code.

Figure 12:
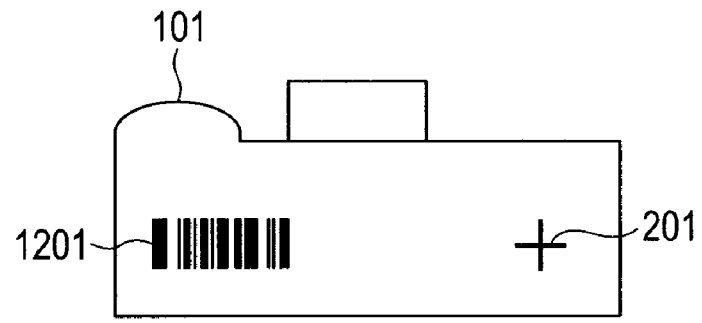
FIG. 12 is a two-dimensional diagram illustrating the bottom of the portable information device.

FIG. 12 is a two-dimensional diagram illustrating the bottom of the portable information device 101 according to the present embodiment. In FIG. 12, a bar code 1201 is added to the outer case of the portable information device 101. Here, it should be noted that the bar code 1201 is acquired by encoding the terminal information.

Figure 13:
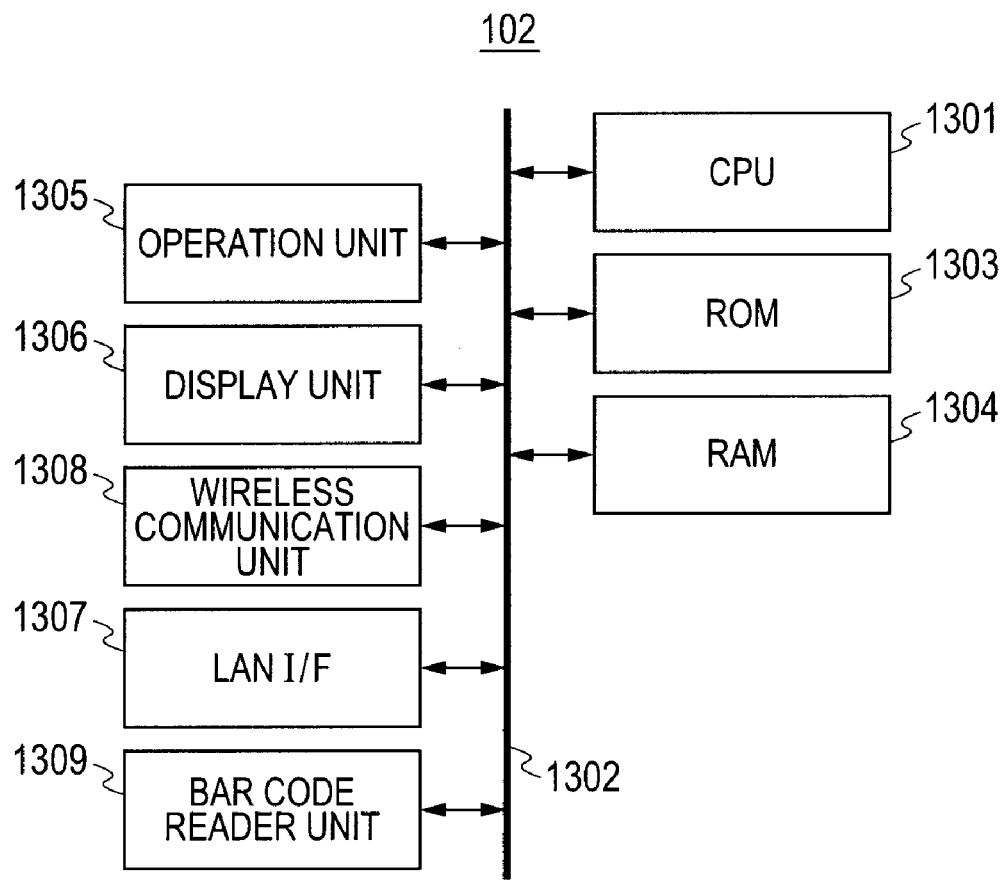
FIG. 13 is a block diagram for describing a constitution of a wireless interface apparatus.

FIG. 13 is a block diagram for describing a constitution of the wireless interface apparatus 102 according to the present embodiment. In FIG. 13, the wireless interface apparatus 102 includes a CPU 1301, a system bus 1302, a ROM 1303, a RAM 1304, an operation unit 1305, a display unit 1306 and a LAN I/F 1307 which respectively perform the functional processes equivalent to those respectively performed by the constituent units 301 to 307 of the wireless interface apparatus 102 illustrated in FIG. 3. Incidentally, a wireless communication unit 1308 has the same constitution as that of the wireless communication unit 308 in the first embodiment, but, in the wireless communication unit 1308, the setting of the communication distance is fixed to the distance 2. Further, a bar code reader unit 1309 has a reading function to read and analyze the image information such as the bar code 1201 added to the portable terminal device 101.

Subsequently, the process to be performed at the time when the communication between the wireless interface apparatus 102 and the portable information device 101 will be described with reference to the flow charts illustrated in FIGS. 11A and 11B. That is, in S1103, the bar code 1201 of the portable information device 101 is read by the bar code reader unit 1309 of the wireless interface apparatus 102, whereby the terminal information is acquired. Here, the process to be performed in the following steps is the same as that described in the second embodiment illustrated in FIGS. 11A and 11B.

According to the present embodiment, it becomes possible to surely and easily start the near field wireless communication in the state that the distance between the portable information device 101 and the wireless interface apparatus 102 is equivalent to the distance 2.

Other Embodiments

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or an apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-168681, filed Jul. 17, 2009, which is hereby incorporated by reference herein in its entirety.

What is claimed is:

1. A communication apparatus comprising:
    an acquiring unit configured to acquire identification information for identifying a portable information device;
    an image display unit configured to display an image which indicates a shape of the portable information device identified by the identification information acquired by the acquiring unit;
    a message display unit configured to display a message for urging a user to move the portable information device closer to the image; and
    a communication unit configured to perform wireless data communication with the portable information device which is moved closer to the image displayed by the image display unit.

2. A communication apparatus according to claim 1, wherein the acquiring unit acquires the identification information by performing wireless communication with the portable information device.

3. A communication apparatus according to claim 1, wherein the communication unit includes a first communication unit and a second communication unit,
    the acquiring unit acquires the identification information by the second communication unit, and
    the image display unit displays the image which indicates the shape of the portable information device identified by the identification information acquired by the acquiring unit, the communicating unit performing the wireless data communication with the portable information device which is moved closer to the image.

4. A communication apparatus according to claim 1, wherein the shape is an outer shape of the portable information device.

5. A communication apparatus according to claim 1, wherein the acquiring unit acquires the identification information by reading image information described on the portable information device.

6. A control method for controlling a communication apparatus, comprising:
    acquiring identification information for identifying a portable information device;
    displaying an image which indicates a shape of the portable information device identified by the acquired identification information;
    displaying a message for urging a user to move the portable information device closer to the image; and
    performing wireless data communication with the portable information device which is moved closer to the image.

7. A non-transitory computer readable storage medium for storing a computer executable program for controlling a communication apparatus, comprising:
    a code to acquire identification information for identifying a portable information device;
    a code to display an image which indicates a shape of the portable information device identified by the acquired identification information;
    a code to display a message for urging a user to move the portable information device closer to the image; and
    a code to perform wireless data communication with the portable information device which is moved closer to the image.

8. A communication apparatus comprising:
    an acquiring unit configured to acquire device information of a portable information device;
    a display unit configured to display, in a case where the device information includes shape information indicating a shape of the portable information device, an image which indicates the shape of the portable information device in accordance with the shape information, and to obtain, in a case where the device information does not include the shape information, the shape information from a storage unit for storing the shape information and display an image which indicates the shape of the portable information device in accordance with the obtained shape information; and
    a communication unit configured to perform wireless data communication with the portable information device which is moved closer to the image displayed by the image display unit.

* * * * *